(12) United States Patent
Disatnik et al.

(10) Patent No.: US 11,252,522 B2
(45) Date of Patent: Feb. 15, 2022

(54) DETECTING AUDIO PATHS BETWEEN MOBILE DEVICES AND EXTERNAL DEVICES

(71) Applicant: GOOGLE LLC, Mountain View, CA (US)

(72) Inventors: Gil Disatnik, Kibbutz Yakum (IL); Shalom Shaltiel, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 358 days.

(21) Appl. No.: 16/484,824

(22) PCT Filed: Aug. 1, 2018

(86) PCT No.: PCT/US2018/044827
§ 371 (c)(1),
(2) Date: Aug. 8, 2019

(87) PCT Pub. No.: WO2020/027828
PCT Pub. Date: Feb. 6, 2020

(65) Prior Publication Data
US 2021/0337330 A1    Oct. 28, 2021

(51) Int. Cl.
*H04R 29/00* (2006.01)
*G01C 21/36* (2006.01)

(52) U.S. Cl.
CPC ......... *H04R 29/00* (2013.01); *G01C 21/3629* (2013.01); *H04R 2420/05* (2013.01); *H04R 2420/07* (2013.01); *H04R 2499/13* (2013.01)

(58) Field of Classification Search
CPC ................ H04R 29/00; H04R 2420/05; H04R 2420/07; H04R 2499/13; G01C 21/3629
See application file for complete search history.

(56) References Cited

U.S. PATENT DOCUMENTS 6,778,073 B2    8/2004    Lutter et al.
2008/0070516 A1    3/2008    Lee et al.
(Continued)

FOREIGN PATENT DOCUMENTS

DE    10 2010 007 712 A1    8/2011
JP    2006-340285 A    12/2006

OTHER PUBLICATIONS

International Search Report and Written Opinion for Application No. PCT/US2018/044827, dated Apr. 8, 2019.
(Continued)

*Primary Examiner* — Jason R Kurr
(74) *Attorney, Agent, or Firm* — Marshall, Gerstein & Borun LLP (57) ABSTRACT

Providing navigation instructions in an automotive environment includes generating, at the portable device, a test audio signal. The test audio signal is provided to the head unit of the vehicle via a short-range communication link. The portable device then detects whether the test audio signal has been converted to sound by one or more speakers in the head unit of the vehicle. In response to detecting the audio signal at the portable device, a vocalized navigation instruction is directed to the head unit for announcement via the one or more speakers of the head unit. Otherwise, in response to not detecting the test audio signal at the portable device, the vocalized navigation instruction is provided via a speaker of the portable device.

20 Claims, 6 Drawing Sheets

(56) References Cited

U.S. PATENT DOCUMENTS

| | | | |
|---|---|---|---|
| 2008/0254751 A1* | 10/2008 | Lazaridis | H04M 1/72412 |
| | | | 455/74 |
| 2011/0116642 A1* | 5/2011 | Hall | H04R 5/04 |
| | | | 381/58 |
| 2011/0169632 A1 | 7/2011 | Walker et al. | |
| 2013/0223631 A1* | 8/2013 | Greuet | H04B 5/0006 |
| | | | 381/17 |
| 2014/0079242 A1 | 3/2014 | Nguyen et al. | |
| 2014/0162616 A1* | 6/2014 | Bradley | H04M 1/72463 |
| | | | 455/418 |
| 2015/0260528 A1 | 9/2015 | Bailiang | |
| 2017/0344336 A1* | 11/2017 | Lotfizadeh | H04R 3/12 |

OTHER PUBLICATIONS

Yang et al., "Detecting Driver Phone Use Leveraging Car Speakers," Proceedings of the Annual International Conference on Mobile Computing and Networking, MOBICOM, 2011.

\* cited by examiner

DETECTING AUDIO PATHS BETWEEN MOBILE DEVICES AND EXTERNAL DEVICES

FIELD OF THE DISCLOSURE

The present disclosure relates to detecting connectivity between devices and, in particular, to detecting an audio path between a mobile device and an external device.

BACKGROUND

Today, numerous communication protocols and standards allow electronic devices to be coupled to external devices and direct video and/or audio output to these external devices. For example, a smartphone can connect to an external speaker via a wireless personal area network (WPAN) that conforms to the Bluetooth™ standard and play audio via the external speaker rather than the speaker embedded in the smartphone. In many cases, when an electronic device detects a connection to an external device at the physical layer (PHY), the electronic device treats the external device as the default path for output and automatically directs all audio generated by applications executing on the portable device to the external device.

However, a connection at the PHY layer does not always imply that the external device reproduces the output of the portable device as expected, as certain settings at the external device and various environmental conditions can affect the presentation. In the automotive environment, for example, a smartphone can connect to the head unit of the vehicle via Bluetooth, but the volume setting at the head unit can be too low, or the head unit can be switched to radio and process audio from other devices. A smartphone in some cases can connect to the head unit via Bluetooth while the speakers and/or other output components of the head unit are turned off, and thus he smartphone can provide audio to the head unit and not receive an indication that the audio effectively is being discarded. Moreover, even when the external device reproduces the audio from the electronic device according to the expected parameters, the user does not always hear the audio. A smartphone equipped with an audio jack, for example, can detect that headphones currently are plugged in, but the user may not be using the headphones.

As a more specific example, when a smartphone or another portable communication device executes a software application that provides navigation instructions, and the user operates the device in a car, the device often provides vocalized navigation instructions to the head unit, by default or in accordance with a user setting. The user may miss important announcements when the head unit does not output audio from the smartphone as expected.

SUMMARY

In an automotive environment, a portable device can determine whether there is an operational audio path between the portable device and the head unit of the vehicle in which the portable device currently is disposed. To this end, the portable device can generate a test audio signal, provide the test audio signal to the head unit, and determine whether the one or more speakers of the external device converted the audio signal to sound. The portable device can use the microphone embedded in the portable device or the microphone embedded in the head unit, depending on the implementation. When the audio path is operational, the portable device can play back navigation instructions, for example, via the speakers of the head unit.

One example embodiment of these techniques is a method in a portable device for providing navigation instructions in an automotive environment. The method includes generating a test audio signal at the portable device and providing the test audio signal to the head unit of the vehicle via a short-range communication link. The method further includes detecting, at the portable device, whether the test audio signal has been converted to sound by one or more speakers in the head unit of the vehicle. In response to detecting the audio signal at the portable device, the method includes directing a vocalized navigation instruction to the head unit for announcement via the one or more speakers of the head unit; otherwise, in response to not detecting the test audio signal at the portable device, the method includes providing the vocalized navigation instruction via a speaker of the portable device.

Another example embodiment of these techniques is a portable device comprising audio hardware configured to generate audio output, a speaker configured to amplify the audio output, a short-range communication interface configured to communicatively couple the portable device to a head unit of a vehicle, and processing hardware. The processing hardware is configured to cause the audio hardware to generate a test audio signal and provide the test audio signal to the head unit of the vehicle via the short-range communication interface. In response to detecting that one or more speakers in the head unit converted the test audio to audio, the processing hardware is configured to direct a vocalized navigation instruction to the head unit for announcement via the one or more speakers of the head unit; otherwise, in response to not detecting the test audio signal, the processing hardware is configured to provide the vocalized navigation instruction via the speaker.

DETAILED DESCRIPTION

Figure 1:
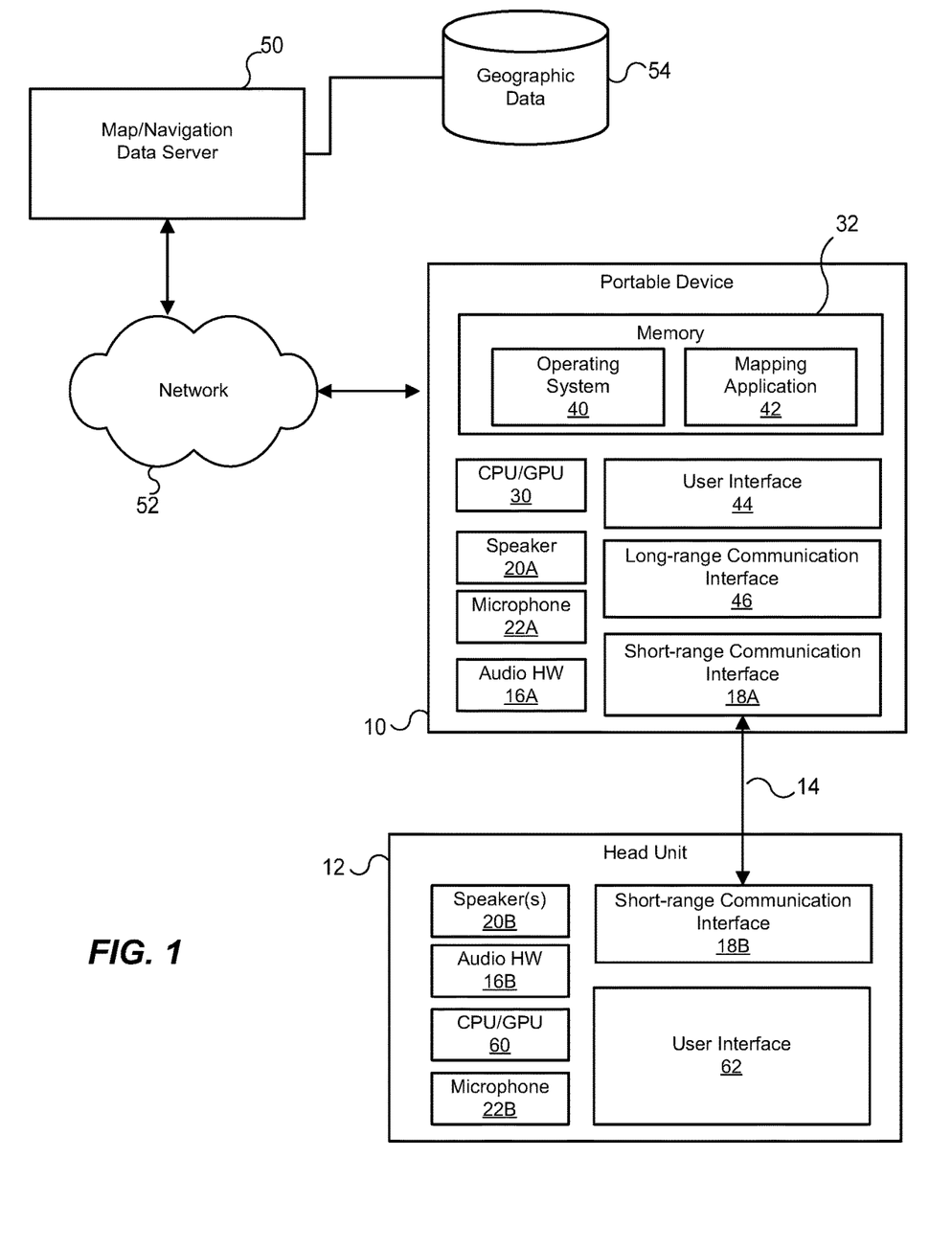
FIG. 1 is a block diagram of an example system including a portable device and a head unit of a vehicle, in which the portable device determines whether an audio path to the head unit is operational, in accordance with some of the techniques of this disclosure.

FIG. 1 illustrates an example system in which a portable device 10 can determine whether an audio path between the portable device 10 and a head unit 12 is operational. The portable device 10 can be communicatively coupled to the head unit 12 via a wired or wireless short-range communication link 14. The portable device 10 can be for example a smartphone, a tablet computer, a wearable device such as a smart watch, etc.

The portable device 10 can generate audio signals using audio hardware 16A and transmit the audio signals to the head unit 12 via a short-range communication interface 18A, in a digital or analog format. As discussed in more detail below, the audio signals may include frequencies in the audible range, outside the audible range, or both. The head unit 12 can receive the audio signals via a short-range communication interface 18B and convert the audio signals to sound via the audio hardware 16B and one or more speakers 20B. The audio hardware 16A and 16B can include digital-to-analog converters (DACs), codecs, etc. The portable device 10 then can determine whether the head unit 12 converts the audio signals as expected using an embedded microphone 22A or, in another implementation, using a microphone 22B embedded in the head unit 12. When the portable device 10 determines that the audio path to the speaker(s) 20B is unavailable, the portable device 10 can direct the audio the embedded speaker 20A.

The portable device 10 further includes processing hardware 30 that can include one or more CPUs, one or more GPUs, and/or any other suitable processing units. A memory 32 can be any suitable non-transitory computer-readable memory including persistent and/or non-persistent components. In an example implementation, the memory 32 stores instructions that implement an operating system 40 and a mapping and/or navigation application 42. These instructions can be executed by the processing hardware 30.

The portable device 10 also can include a user interface 44 to receive input and provide output. For example, the user interface 44 can include a touchscreen. Of course, the speaker 20A and the microphone 22A also can operate as components of the user interface 44. The portable device 10 further can include a long-range communication interface 46 to communicate with a map/navigation data server 50 via a communication network 52, which can be a local area network or a wide area network (e.g., the Internet). The long-range communication interface 46 can support, for example, cellular communications according to various 3G, 4G, 5G, etc. communication standards and/or wide area network communications such as WiFi™. On the other hand, the short-range communication interface 18A can support communications via a wireless personal area network (WPAN) such as Bluetooth™, a wireless local area network (WLAN) such as WiFi™, a wired connection such as Universal Serial Bus (USB), etc.

The server 50 can include any suitable number of devices, each implemented using any suitable processing hardware and non-transitory memory components. The server 50 can be communicatively coupled to a geographic database 52, which can store various geographic data descriptive of various geographic features such as roads, buildings, businesses, city and country boundaries, bodies of water, natural formations, etc. The server 50 can use the information in the geographic database 56 to generate digital maps of geographic areas, navigation instructions for guiding users to various destinations, process queries from user devices, provide information about various businesses, etc.

For example, a user operating the portable device 10 in a vehicle can request navigation directions for driving to a certain location. The user can invoke the application 42, specify the destination, and the application 42 in response can format an appropriate request and transmit the request to the server 50. In response, the server 50 can provide navigation instructions that can include step-by-step directions for completing various maneuvers on the way to the destination, such as "turn left on Main St.," "head straight on interstate highway 94," or "use the right lane to exit the highway." The server 50 in some cases can provide some or all of these instructions in a vocalized (spoken) format for announcement via the speaker 20A or any external device the portable device 10 may be using for audio and/or video output, such as the head unit 12. Alternatively, the portable device 10 can convert the navigation instructions to speech using software components executing on the portable device 10 and the audio hardware 16A.

In addition to the audio hardware 16B, the short-range communication interface 18B, and the speaker(s) 20B discussed above, the head unit 12 can include processing hardware 60 and user interface 62, which can include a touchscreen, various hardware controls (buttons for adjusting the volume, buttons for tuning the radio, etc.).

Figure 2:
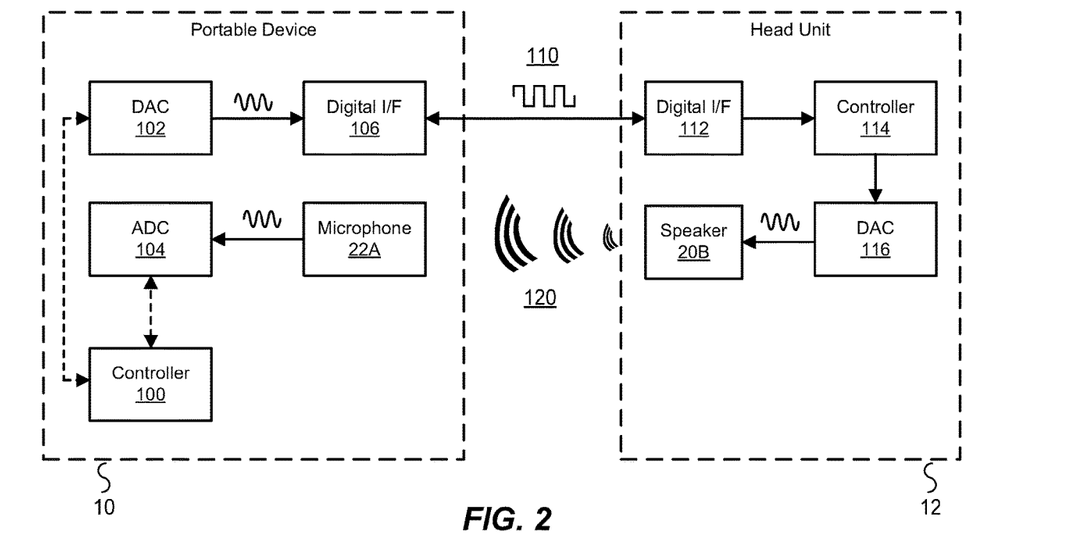
FIG. 2 is a block diagram that illustrates an audio path between components of the portable device and the head unit of FIG. 1, according to one embodiment of the techniques of this disclosure.

Next, FIG. 2 illustrates an example audio path that can be set up between the portable device 10 and the head unit 12. The audio hardware 16A of the portable device 10 can include, among other components, a controller unit 100, a digital-to-analog converter (DAC) 102, and an analog-to-digital converter (ADC) 104, and the short-range communication interface 18A can include a digital interface 104. In an example scenario, the controller 100 receives a command to generate a certain audio signal from the processing hardware 30 and, in response, causes the ADC 102 to generate the audio signal. The digital interface 104 then provides the generated audio signal to the head unit over the communication link 14, in the form of a digitized audio 110. The head unit 12 receives the digitized audio 110 via a digital interface 112 and provides to a controller unit 114, responsible for controlling the audio hardware of the head unit. The controller unit 114 then causes a DAC 116 convert the digitized audio 110 to sound and amplify the sound via the speaker(s) 20B.

The portable device 10 in this example implementation attempts to detect a sound signal 120, output by the speaker(s) 20B, using the microphone 22A. The microphone 22A provides an analog audio signal to the ADC 104, which then converts the analog audio signal to a digital signal and provides the digital signal to the controller 100. In this manner, the controller 100 can determine whether the audio path is operational. More particularly, if the controller 100 causes the DAC 102 to generate a particular sound pattern (e.g., a short sequence of numbers encoded using amplitude-shift keying on a 24 KHz carrier wave), and if the controller 100 then identifies this sound pattern in the signal received from the ADC 104, the audio path can be considered operational: the communication link 14 has been established, the relevant components of the head unit 12 are turned on, the speaker(s) 20B is set to a sufficiently high volume, etc.

Figure 3:
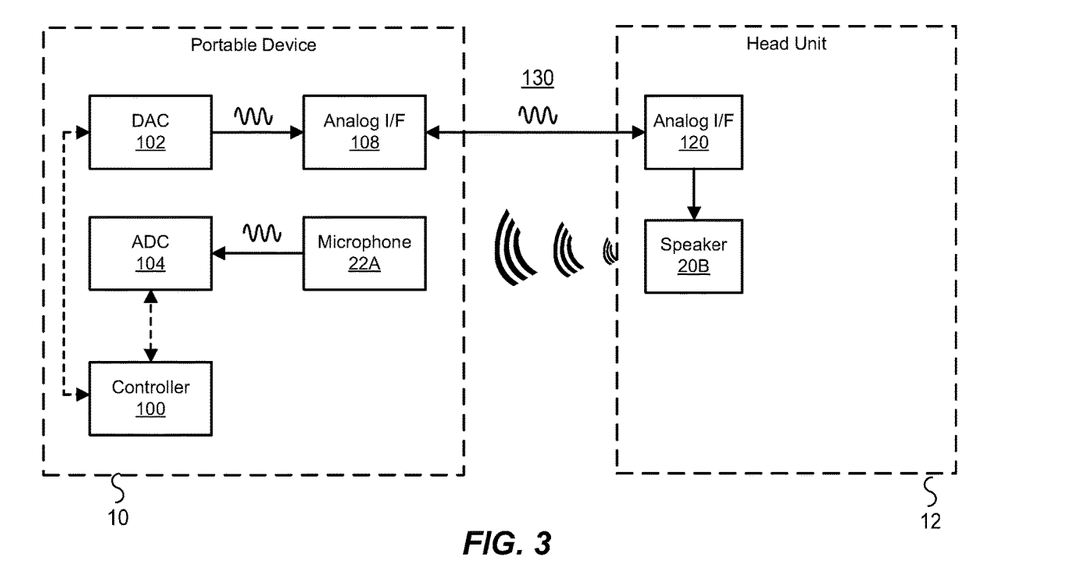
FIG. 3 is a block diagram that illustrates an audio path between components of the portable device and the head unit of FIG. 1, according to another embodiment of the techniques of this disclosure.

FIG. 3 illustrates another example implementation which the portable device 10 provides a test audio signal 130 in an analog format to the head unit 12 via an analog interface 108. The head unit 12 in this case receives the analog test audio signal via an analog interface 120 and directs the received audio signal to the speaker(s) 20B. Similar to the configuration of FIG. 2, the portable device 10 attempts to detect the output by the speaker(s) 20B via the microphone 22A.

It is noted that whereas the operating system 40 of the portable device 10 can automatically detect absence or failure of the communication link 14 at the PHY layer, the operating system 40 generally cannot determine whether the speaker(s) 20B at the head unit 12 are activated, whether the volume setting is sufficiently high for the user to hear audio output, and in some cases whether the communication link 14 is operational at higher layers of communication stack. The portable device 10 can be configured to send a certain command to the head unit to obtain a report of the volume setting, the status of the audio components of the head unit, etc.; however, this approach requires that the portable device and the head unit support certain communication protocols. On the other hand, a portable device of this disclosure can automatically determine whether the audio path is operational using a test audio signals as schematically illustrated in FIGS. 2 and 3, without requiring that the head unit support specialized commands for reporting equipment status.

Figure 4:
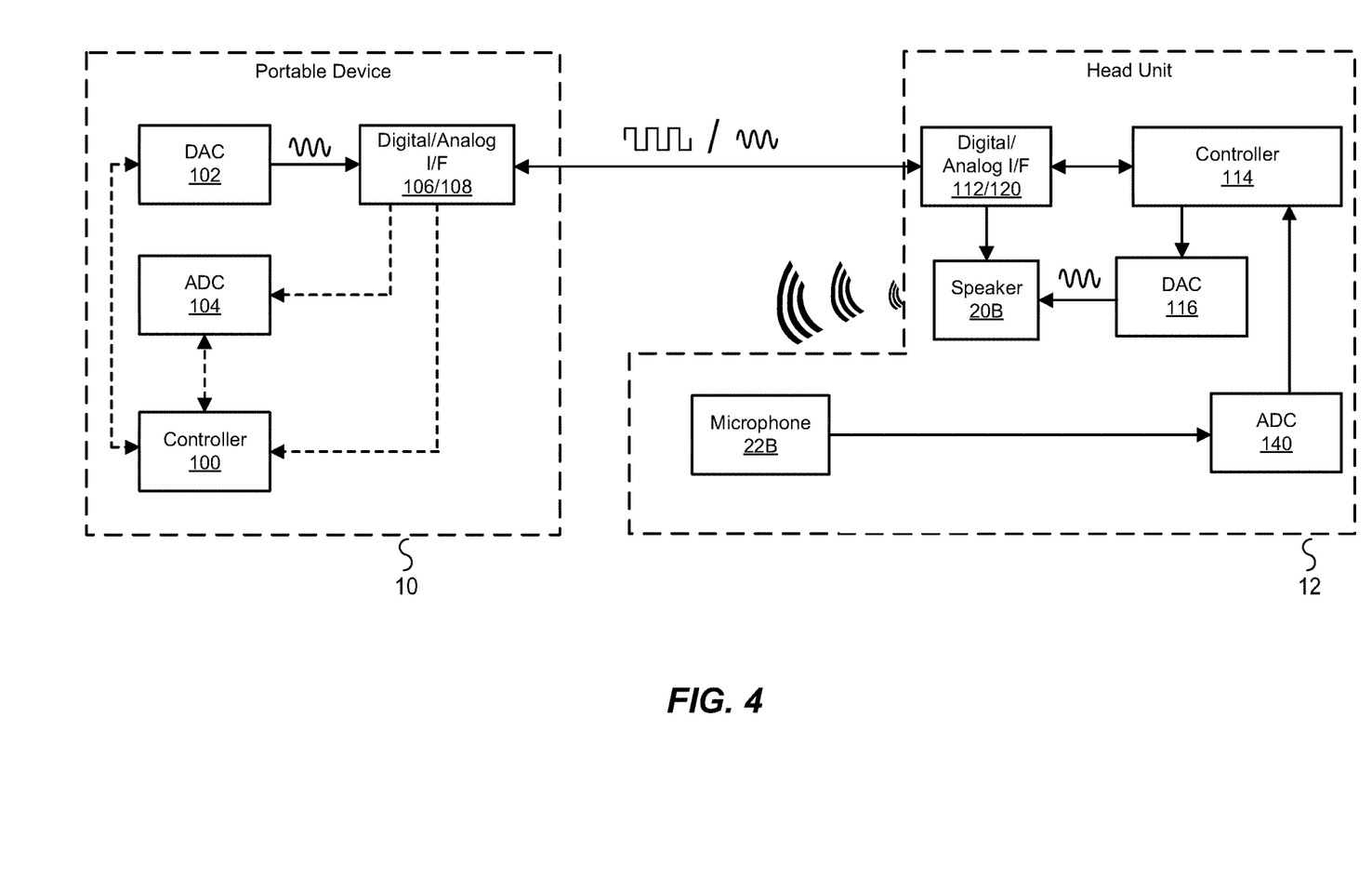
FIG. 4 is a block diagram that illustrates an audio path between components of the portable device and the head unit of FIG. 1, according to yet another embodiment of the techniques of this disclosure.

Now referring to FIG. 4, the portable device 10 in some implementations can determine whether the audio path is operational using the microphone 22B embedded in the head unit 12. When the portable device is disposed inside the vehicle (e.g., in the cup holder, mounted on the dashboard, in the driver's hand), the respective microphones of the portable device and the head unit receive substantially the same audio input, possibly with minor variations due to the differences in the hardware as well as different positioning and orientation within the vehicle. The portable device 10 accordingly can assess the operational status of the audio path using the microphone 22B instead of the microphone 22A.

The portable device 10 in this case generates a test audio signal in the form of digitized audio similar to the scenario of FIG. 2 or analog audio similar to the scenario of FIG. 3. The head unit 12 receives the audio signal via the digital interface 112 or analog interface 120 and provides the audio signal to the speaker 20B, directly or via the controller 114 and the DAC 116, depending on the implementation. In any case, the microphone 22B receives the audio output by the speaker 20B and converts the received audio to an electric signal. Depending on the implementation, the electric signal can be converted to a digital format using an ADC 140 and provided to the digital interface 112 via the controller unit 114, or directly provided to the analog interface 120. The head unit 12 then provides the test audio signal to the portable device 10. Alternatively, the controller 114 of the had unit 12 can process the test audio signal and provide an indication of whether a certain audio signal was received via the microphone 22B.

An example method 200 for providing navigation instructions in an automotive environment of any of the FIGS. 1-4 is discussed next with reference to FIG. 5. The method 200 can be implemented as a set of software instructions stored in a computer-readable memory (e.g., the memory 32) and executable by one or more processors (e.g., the processing hardware 30). In an example implementation, the method 200 is implemented as a function of the application 42.

The method 200 begins at block 202, where a test audio signal is generated at the portable device. Depending on the implementation, execution of block 202 can be triggered by the portable device detecting a connection to the head unit at the PHY layer (e.g., when the user connects the portable device and the head unit via a cable or when the user activates the Bluetooth connection), or when the user launches the navigation application (such as the application 42 discussed with reference to FIG. 1), and the portable device determines that the navigation application should operate in the projected mode, i.e., by redirecting output to an external device. As another alternative, the navigation application can execute block 202 in advance of providing the next navigation direction to the user, e.g., in response to determining that a next navigation instruction is available at the portable device for announcement. As yet another alternative, a user can trigger the test of the audio path manually via a corresponding UI control.

The test audio signal can include one or several frequencies above 20 KHz, i.e., outside the audible range. In this manner, the portable device in some cases can determine whether the audio path is operational without the user noticing being aware of the test. In one example scenario, the portable device generates a test audio signal that includes a sequence of 20 ms beeps, with the duration of the sequence being approximately equal to twice the latency of the communication link between the portable device and the head unit (thus, for Bluetooth latency of 100 ms, the duration of the sequence can be 200 ms, for Bluetooth latency of 200 ms, the duration of the sequence can be 400 ms, etc.). Each beep can be a tone at a certain ultrasonic frequency. The portable device can modulate the audio using on-off keying (OOK) or another suitable technique. In another example scenario, the test audio signal includes several frequencies, with one or more frequencies in the audible range and one or more frequencies outside the audible range. In still another scenario, the test audio signal is a vocalized navigation instruction or a portion of the vocalized navigation instruction.

At block 204, the test audio signal is provided to the head unit to which the portable device is communicatively coupled. As discussed above, the test audio signal can be transmitted via a wired (e.g., USB) or wireless (e.g., Bluetooth) communication link, and the audio can be transmitted using any suitable analog or digital format. More generally, the test audio signal can be provided to any external device.

Next, at block 206, the portable device can attempt to detect the test audio signal. As discussed above, the portable device can use the microphone embedded in the portable device or the microphone embedded in the head unit. More generally, the portable device can use any internal or external microphone to receive the test audio signal, or receive an indication of whether the test audio signal is audible in the interior of the car from any suitable source, including for example a peer audible device operated by a passenger of the vehicle.

To determine whether the one or more speakers of the head unit converted the test audio signal to audio, the portable device can detect whether the particular pattern contained in the test audio signal is present in the input received by the microphone. For example, if the test audio signal includes a sequence of beeps of certain duration and certain frequency, the portable device at block 206 can determine whether the received input includes the same sequence. Similarly, if the test audio signal includes a vocalized navigation instruction, the portable device at block 206 can determine whether the received input includes the vocalized navigation instruction.

In some cases, at least one speaker in the head unit is operational and properly receives audio signals from the portable device. However, due to a low volume setting, the portable device cannot detect the audio signal in the output of the speaker of the head unit. The head unit will consider the audio path to be non-operational because the driver is unlikely to hear vocalized navigation instructions provided via the head unit. Thus, as applied to audio paths between a portable device and a head unit in this disclosure, the term "operational" refers to the ability of a person in the vehicle to hear vocalized navigation instructions, as estimated by the portable device "listening" to test audio signals and/or vocalized navigation instructions using a microphone.

If the test audio signal is detected at block 208, the flow proceeds to block 210; otherwise, the flow proceeds to block 212. In some cases, however, the method 200 includes re-executing blocks 202-208 one or more times to determine whether certain variations in the test audio signals produce better results, as indicated in FIG. 5 using dashed lines. For example, the portable device can generate a test audible signal including a frequency outside the audible range (e.g., above 20 KHz) in the first instance at block 202 and, in response to not detecting the test audio signal at block 208, execute block 202 again to generate a test audible signal including a frequency within the audible range (e.g., between 20 Hz and 20 KHz) and again execute blocks 204-208. Alternatively, the portable device can generate a single test audible signal at block 202 including a first portion with a frequency outside the audible range and a second portion with a frequency within the audible range, where the first portion and the second portion form a contiguous signal.

In various other implementations, the portable device can iteratively modify the frequency of the test audio signal and/or the amplitude of the test audio signal. The portable device can modify these parameters in different respective portions of a single contiguous signal or when executing different instances of block 202. By varying the amplitude of the test audio signal, the portable device can determine not only whether the audio path is operational, but also what amplitude of the audio can be detected. Thus, in one instance the portable device can determine that the driver probably will hear a vocalized navigation instruction at a certain default amplitude of the audio signal, and in another instance the portable device can determine that the driver probably will hear the vocalized navigation instruction only if the amplitude of the audio signal is significantly increased. The portable device can use this information to control the amplitude of subsequent vocalized navigation instruction or to provide an appropriate notification to the driver.

Figure 5:
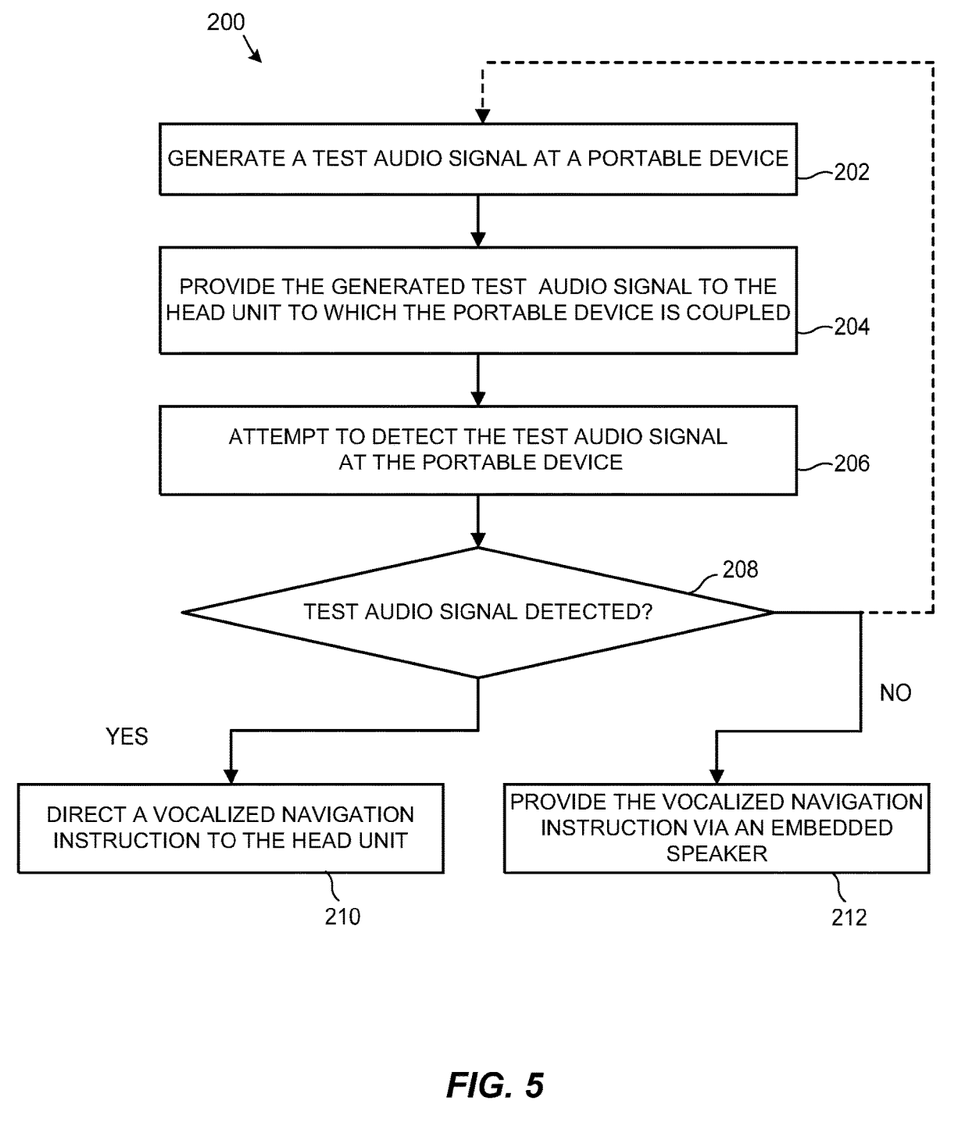
FIG. 5 is a flow diagram of an example method for providing navigation instructions in an automotive environment, which can be implemented in the system of FIG. 1.

With continued reference to FIG. 5, vocalized navigation instruction is provided to the head unit at block 210. In different implementations, the vocalized navigation instruction can be provided immediately after blocks 202-208 are executed or after a certain period of time. As discussed below with reference to FIG. 6, the portable device in some case may confirm that the audio path is still operational by "listening" to subsequent navigation instructions.

Otherwise, at block 212, the vocalized navigation instruction is played back via the speaker of the portable device. Additionally or alternatively, the portable device can provide textual or visual navigation instructions upon determining that the audio path between the portable device and the head unit is not operational. For example, the navigation application can be configured to provide only vocalized navigation instructions to an external device when the audio path is operational. However, when the audio is not operation, the navigation application can be configured to not only provide vocalized navigation instructions via the embedded speaker but also to provide visual output via the display built into the head unit or the display of the portable device, for example. The navigation application also can be configured to generate haptic output (e.g., vibration) when the audio path to the head unit is not operational.

Figure 6:
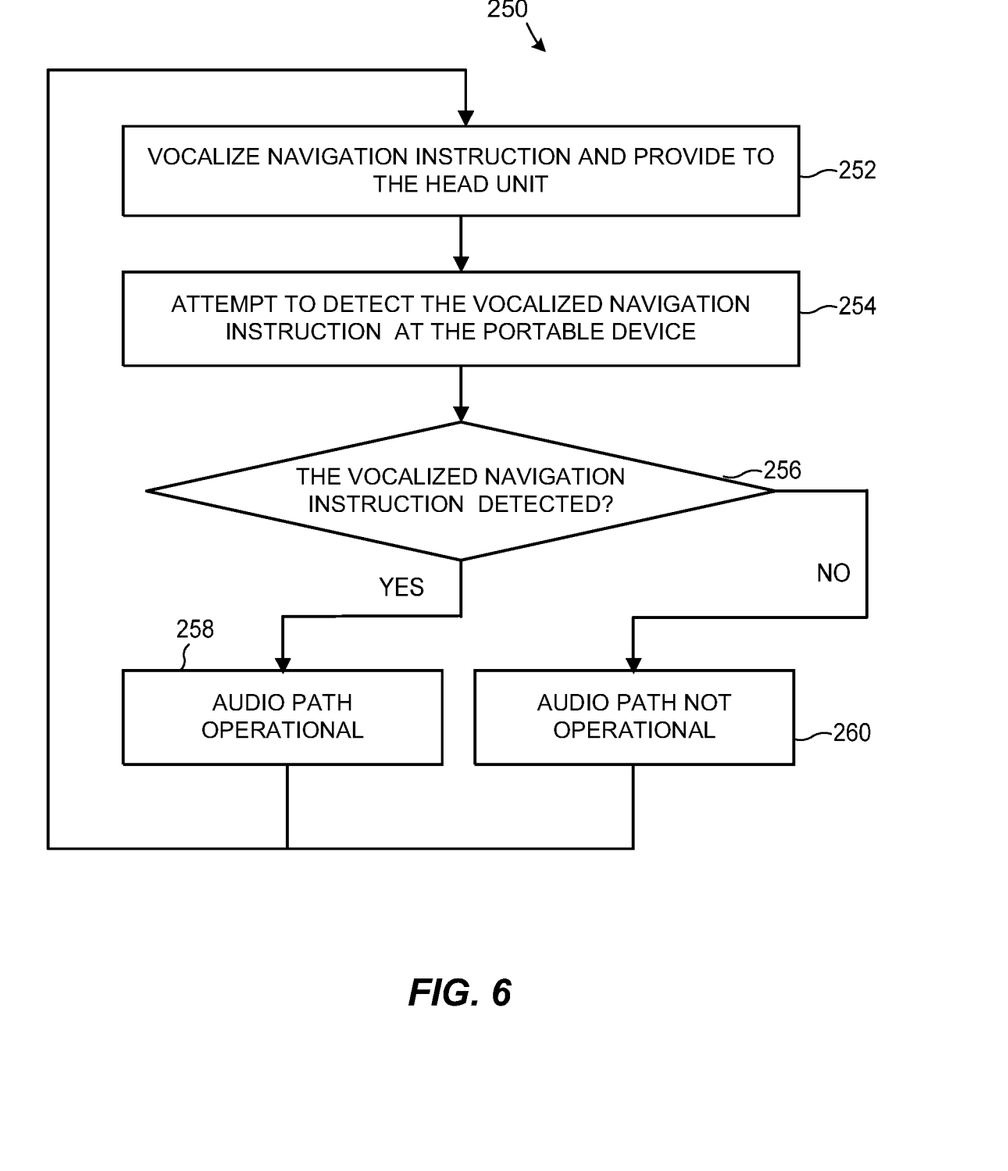
FIG. 6 is a flow of an example method for monitoring an audio path between a portable device and the head unit of a vehicle, which can be implemented in the system of FIG. 1.

Now referring to FIG. 6, a method 250 for monitoring an audio path between a portable device and the head unit of a vehicle can be implemented as a set of software instructions stored in a computer-readable memory (e.g., the memory 32) and executable by one or more processors (e.g., the processing hardware 30), similar to the method 200. The application 42 for example can execute the method 250 subsequently to determining that the audio path is operational according to the method 200, to confirm that the audio path is still operational.

The method 250 begins at block 252, where a navigation instruction is vocalized and provided to the head unit. The portable device then attempts to detect the audio including to the vocalized navigation instruction using the embedded microphone or an external microphone, at block 254. If the vocalized navigation instruction is detected at block 256, the flow proceeds to block 258, where the portable device confirms that the audio path is operational. The portable device can for example maintain a flag indicative of the status of the audio path in the memory.

Otherwise, if the vocalized navigation instruction is not detected at block 256, the flow proceeds to block 260. Depending on the implementation and/or the importance of the navigation instruction, the portable device can immediately attempt to provide the vocalized navigation instruction via the embedded speaker, display a warning via the user interface of the portable device or the display embedded in the head unit, repeat the attempt to provide the vocalized navigation instruction via the head unit, etc. Further, the portable device can update the flag indicative of whether the audio path is operational in the memory.

Thus, the portable device can first determine whether there is an operational audio path between the portable device and the head unit in accordance with the method 200 and then monitor the audio path in accordance with the method 250.

Figure 7:
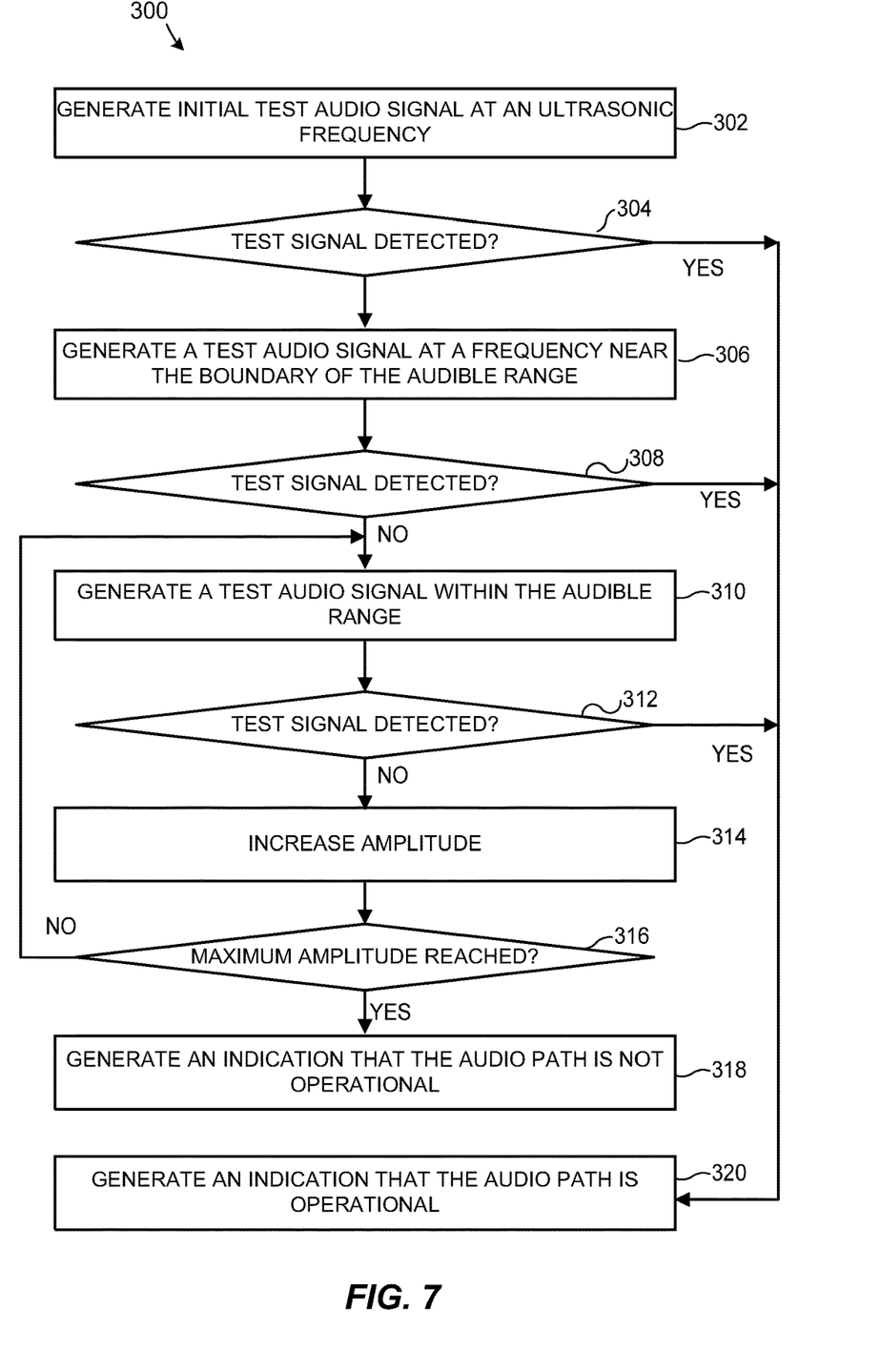
FIG. 7 is a flow of an example method for generating a test audio signal to determine whether an audio path is operational, which can be implemented in the system of FIG. 1.

For further clarity, FIG. 7 illustrates an example method 300 for generating a test audio signal to determine whether an audio path is operational. Similar to the methods 200 and 250 discussed above, the method 300 can be implemented as a set of software instructions stored in a computer-readable memory and executable by one or more processors.

The method 300 begins at block 302, where an initial test audio signal is generated. In this example implementation, the initial test audio signal includes an ultrasonic frequency. If the initial test audio signal is detected at block 304, the audio path is determined to be operational, and the flow proceeds to block 320. Otherwise, the flow proceeds to block 306, where a test audio signal at a frequency near the boundary of the audible range is generated. For example, the test audio signal generated at block 302 can include a frequency of 30 KHz, and the test audio signal generated at block 306 can include a frequency of 20 KHz.

If the initial test audio signal is detected at block 308, the audio path is determined to be operational, and the flow proceeds to block 320. Otherwise, the flow proceeds to block 310. Next, a test audio signal including a frequency within the audible range is generated (for example, 300 Hz). If the initial test audio signal is detected at block 312, the audio path is determined to be operational, and the flow proceeds to block 320. Otherwise, the flow proceeds to block 314.

The amplitude of the test audio signal can be iteratively increased at block 314, and the method 300 can iterate through blocks 310-314 until a maximum amplitude is reached. When it is determined that the maximum amplitude has been reached, the method proceeds to block 318 to generate indication that the audio path is not operational. As discussed above, the indication can cause the portable device to switch the audio path to the embedded speaker, shift to visual output via the display of the portable device and/or the display of the head unit, shift to haptic output, etc. Further, the portable device in some cases can provide an indication, in the form of a pop-up window for example, that the user may not hear vocalized navigation instructions or other announcements from the portable device.

On the other hand, at block 320, an indication that the audio path is operational can be generated. This indication need not include an affirmative confirmation for the user and may include an update to a flag stored in the memory of the portable device. In some implementations, the determination of availability of the audio path and the corresponding flag may be managed by the navigation application. In other implementations, the operating system of the portable device can manage the determination of availability of the audio path and accordingly can expose the flag to all applications executing on the portable device.

The blocks 306, 310, and 314 in general need not be executed in the order illustrated in FIG. 7. For example, a portable device can first iterate through multiple amplitude settings at an ultrasonic frequency prior to lowering the frequency to the near-audible or audible range. Further, blocks 306/310 and 314 can be executed in parallel to modify several parameters of the audio signal at the same time.

The techniques discussed above can be used with video output as well as audio-only output. For example, a portable device can provide video output to a head unit equipped with a display and a speaker, and the video path may be available while the audio path is unavailable. The techniques of this disclosure can be used whether the audio will be output without sound via the head unit.

Further, the techniques discussed above can be used with other external devices such as wireless external speakers, wired external speakers, wired or wireless headphones, peer devices used for output, etc.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 200, 250, and 300 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The methods may be included as part of any backend server (e.g., a map data server, an organization server, or any other type of server computing device, as described herein), client computing device modules of the example environment, for example, or as part of a module that is external to such an environment. Though the Figs. may be described with reference to the other Figs. for ease of explanation, the methods can be utilized with other objects and user interfaces. Furthermore, although the explanation above describes steps of the methods being performed by specific devices (such as the portable device 10), this is done for illustration purposes only. The blocks of the methods may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the Figs. depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for providing navigation instructions in an automotive environment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a portable device for providing navigation instructions in an automotive environment, the method comprising:
generating, at the portable device, a test audio signal;
providing the test audio signal to the head unit of the vehicle via a short-range communication link;
detecting, at the portable device, whether the test audio signal has been converted to sound by one or more speakers in the head unit of the vehicle;
in response to detecting the audio signal at the portable device, directing a vocalized navigation instruction to the head unit for announcement via the one or more speakers of the head unit;
otherwise, in response to not detecting the test audio signal at the portable device, providing the vocalized navigation instruction via a speaker of the portable device.

2. The method of claim 1, wherein the generated test audio signal includes a frequency higher than 20 KHz.

3. The method of claim 2, further comprising modulating the test audio signal using on-off keying (OOK).

4. The method of claim 1, wherein providing the test audio signal and detecting whether the test audio signal has been converted includes:
generating, at the portable device, a first portion of the test audio signal including a frequency higher than 20 KHz, and
in response to not detecting the first portion of the test audio signal at the portable device, generating, at the portable device, a second portion of the test audio signal including a frequency between 20 Hz and 20 KHz.

5. The method of claim 4, wherein generating the second portion of the test audio signal includes iteratively increasing an amplitude of the test audio signal.

6. The method of claim 1, wherein providing the test audio signal and detecting whether the test audio signal has been converted includes iteratively modifying a frequency of the test audio signal.

7. The method of claim 1, wherein the test audio signal includes an initial vocalized navigation instruction, and wherein the vocalized navigation instruction directed to the head unit or the speaker of the portable device is a subsequent vocalized navigation instruction.

8. The method of claim 1, further comprising:
detecting, at the portable device, whether the vocalized navigation instruction has been converted to sound by the one or more speakers in the head unit of the vehicle; and
in response to not detecting the vocalized navigation instruction at the portable device, providing the vocalized navigation instruction via the speaker of the portable device.

9. The method of claim 1, wherein detecting whether the test audio signal has been converted to sound includes using a microphone embedded in the portable device.

10. The method of claim 1, wherein detecting whether the test audio signal has been converted to sound includes:
using a microphone embedded in the head unit device to receive audio input, and
receiving, at the portable device at the head unit, an indication of whether the audio input was received at the head unit.

11. The method of claim 1, wherein generating the test audio signal is in response to detecting that the short-range communication link with the head unit of the vehicle has been established.

12. A portable device comprising:
an audio hardware configured to generate audio output;
a speaker configured to amplify the audio output;
a short-range communication interface configured to communicatively couple the portable device to a head unit of a vehicle; and
a processing hardware configured to:
cause the audio hardware to generate a test audio signal,
provide the test audio signal to the head unit of the vehicle via the short-range communication interface,
in response to detecting, at the portable device, that one or more speakers in the head unit converted the test audio to audio, direct a vocalized navigation instruction to the head unit for announcement via the one or more speakers of the head unit, and
otherwise, in response to not detecting the test audio signal, provide the vocalized navigation instruction via the speaker.

13. The portable device of claim 12, further comprising: a microphone to detect whether the one or more speakers in the head unit converted the test audio signal to audio.

14. The portable device of claim 12, wherein the processing hardware is configured to receive, via the short-range communication interface, an indication of whether the test audio signal was detected by a microphone embedded in the head unit device.

15. The portable device of claim 12, wherein the generated test audio signal includes a frequency higher than 20 KHz.

16. The portable device of claim 12, wherein the processing hardware is configured to:
cause the audio hardware to generate a first portion of the test audio signal including a frequency higher than 20 KHz, and
in response to not detecting the first portion of the test audio signal, cause the audio hardware to generate a second portion of the test audio signal including a frequency between 20 Hz and 20 KHz.

17. The portable device of claim 16, wherein to generate the second portion of the test audio signal, the processing hardware causes the audio hardware to iteratively increase an amplitude of the test audio signal.

18. The portable device of claim 12, wherein the processing hardware is configured to cause the audio hardware to iteratively modify a frequency of the test audio signal.

19. The portable device of claim 12, wherein the test audio signal includes an initial vocalized navigation instruction, and wherein the vocalized navigation instruction directed to the head unit or the speaker of the portable device is a subsequent vocalized navigation instruction.

20. The portable device of claim 12, wherein the processing hardware causes the audio hardware to generate the test audio signal is in response to detecting that the short-range communication link with the head unit of the vehicle has been established.

* * * * *